Figure 1:
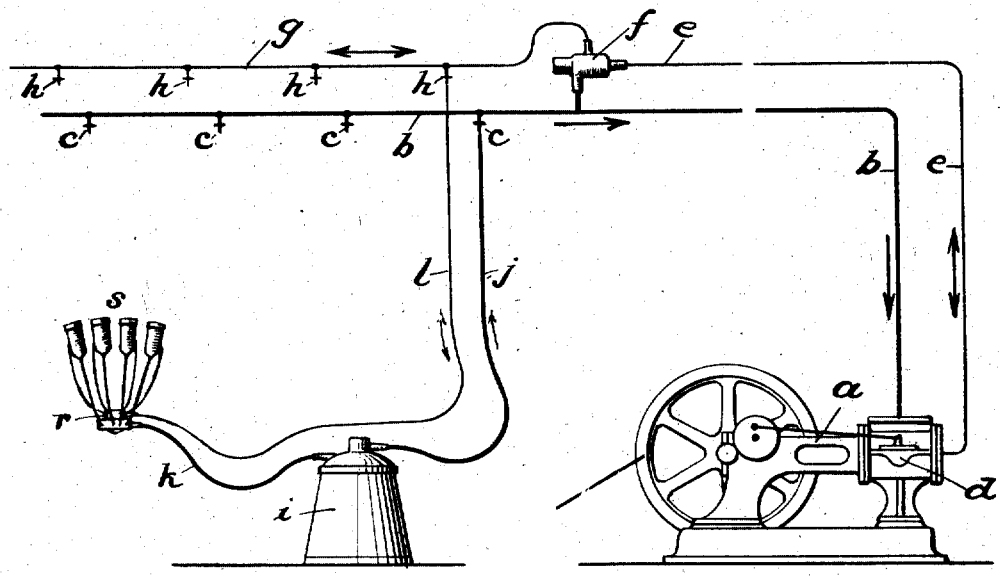

N. J. DAYSH.
MILKING MACHINERY.
APPLICATION FILED NOV. 4, 1916.

1,276,184.

Patented Aug. 20, 1918.

WITNESS:

INVENTOR
Norman J. Daysh
BY
ATTORNEY.

UNITED STATES PATENT OFFICE.

NORMAN JOHN DAYSH, OF POUGHKEEPSIE, NEW YORK, ASSIGNOR TO THE DE LAVAL SEPARATOR COMPANY, A CORPORATION OF NEW JERSEY.

MILKING MACHINERY.

1,276,184.     Specification of Letters Patent.     Patented Aug. 20, 1918.

Application filed November 4, 1916. Serial No. 129,443.

*To all whom it may concern:*

Be it known that I, NORMAN JOHN DAYSH, a subject of the King of Great Britain, residing at Poughkeepsie, county of Dutchess, and State of New York, have invented a new and useful Improvement in Milking Machinery, of which the following is a full, clear, and exact description, reference being had to the accompanying drawings, which form a part of this specification.

It is known, in the art of milking machines of the pulsating type, that when pulsations are transmitted to the teat cups from a pulsator located at relatively long distance, the pulsations are comparatively weak. Again, where the teat cups are connected to the pulsation line at widely varying distances from the pulsator, the pulsations in the teat cups at the different locations are of such different strength that if they are properly regulated to give pulsations of the required strength to the teat cups when relatively near the pulsator, the pulsations tend to flatten out when the teat cups are located at a more remote distance.

These objections have been found to be particularly serious in that type of installation comprising a vacuum line, a pulsation line connected with a master or primary pulsator, sets of two-chamber teat cups whose inner chambers are connected with the milk pail and the vacuum line, and secondary pulsators, one (say) for each set of teat cups, connected with the pulsation line and operable by the pulsations therein to create pneumatic pulsations in the outer teat cup chambers. An example of such a type of milking machine is to be found in the patent to Leitch, No. 1,196,000, issued August 29, 1916. In such a machine the master pulsator is located at a point where mechanical power is conveniently available, generally at the pump that produces the vacuum in the vacuum line, and at various points along the two mains, cocks are provided to permit working connections to be established between the mains and the branch pipes connected with the pail and teat cups.

When these connections are made at a point more or less remote from the master pulsator, the master pulsations flatten out until they are too weak to operate the secondary pulsator. The result is that the practical operativeness of milking machinery of the type above described is limited to installations wherein conditions permit the location of the master pulsator comparatively close to the branch pipe connections and to installations of limited size and, notwithstanding its pronounced advantages over other types of milking machinery, has been found unworkable, or at least unsatisfactory, when conditions compel the location of the primary pulsator at a substantial distance from the branch pipe connections or where long mains are required owing to the size of the installation.

The object of my invention is to provide means whereby the pulsations from the master pulsator to the secondary pulsator may be carried through a long line and transmitted to the secondary pulsator in substantially their full strength.

Figure 2:
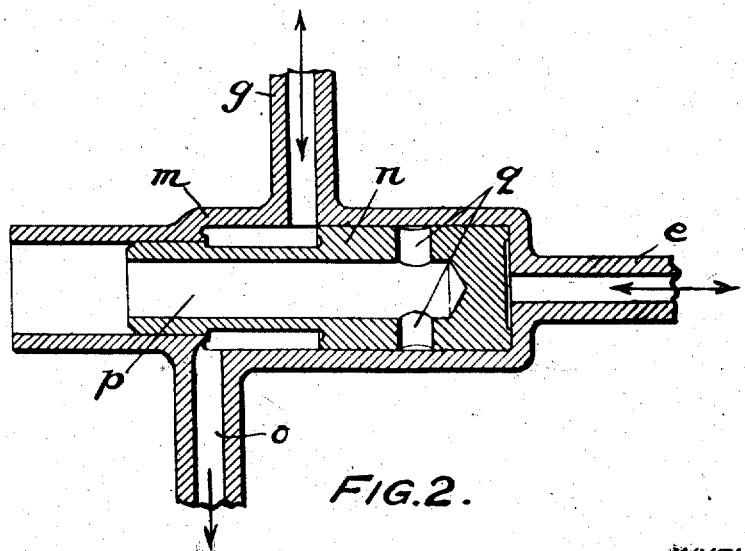

In the accompanying drawings, which illustrate a preferred form of my invention, Figure 1 is a diagrammatic view of a complete installation and Fig. 2 a longitudinal section of the relay forming part of such installation.

In Fig. 1 I have shown a vacuum pump $a$ and vacuum pipe line $b$ with cocks $c$, a master pulsator valve $d$ and master pulsation pipe line $e$, a relay $f$, and a secondary pulsation line $g$ with cocks $h$. A milk pail $i$ is connected to the vacuum pipe by a flexible tube $j$ and to the claw by the flexible milk pipe $k$. A flexible pulsation pipe $l$ connects the claw pulsator valve chamber $r$ with the secondary pulsation line $g$.

The above described combination, with the exception of the interposition in the pulsator line of the relay valve, is known in the art. This valve, in its preferred form, as shown in Fig. 2 comprises a two-diameter cylinder $m$ in which a differential piston $n$ reciprocates. The smaller end of the cylinder is open to the atmosphere and the larger end to the master pulsation pipe $e$. At the point where the larger and smaller diameter cylinders are joined together is connected a pipe $o$ that communicates with the vacuum pipe line $b$. The secondary pulsation line $g$ connects to the side of the large diameter portion of the cylinder. Through the center of the smaller portion of the differential piston is a hole $p$ open to the atmosphere, and having branches $q$ terminating midway of the length of the larger portion of the piston. The relative sizes of the small cylinder the large cylinder and the differential area are such that, with a pressure in the end of the large cylinder approximately half way between atmospheric and the full vacuum in the pipe line, the forces will be balanced and the piston will remain at rest. If the pressure in the large end is materially increased the piston will be moved to the left and if materially decreased it will be moved to the right. I have found that the design as shown is easily moved and will respond to small changes in pressure in the pipe $e$. At the time of a low pressure wave in the primary pulsation pipe $e$ the piston will take the position shown and the secondary pulsation pipe will be exhausted into the vacuum pipe. At the time of a high pressure wave in pipe $e$ the piston will move to the left and atmospheric pressure will enter through the hole $p$ and branches $q$ to fill the secondary pulsation pipe $g$.

In the above described manner comparatively weak pulsations at the end of a long primary pulsation pipe will operate the relay valve to produce full strength pulsations in a secondary pulsation pipe.

I have not separately illustrated the secondary pulsator in the valve chamber $r$, but it will be understood by those skilled in the art that it may be a pulsator valve of the same type as the relay valve shown in Fig. 2, which may be assumed to illustrate such a pulsator valve if the pipe $e$ is assumed to be the pulsation pipe $l$ and the pipes $o$ and $g$ the connections respectively to the vacuum line and to the outer teat cup chambers.

It will be understood that the invention is shown in its simplest form and that a plurality of relay valves may be employed, which may be arranged to connect up, either in series or in multiple with each other, a plurality of secondary pulsation lines with the primary pulsation line.

Having now fully described my invention, what I desire to claim and protect by Letters Patent is:

1. In a milking machine operating system, in combination, a portable milking machine unit comprising teat cups and connections, a pulsation branch pipe connected with said unit and adapted to convey pneumatic pulsations thereto, a plurality of fixed pulsation pipe lines, a primary pulsator connected with and adapted to produce pneumatic pulsations in one of the pulsation pipe lines, a relay valve interposed between adjacent pulsation pipe lines and controllable by the pneumatic pulsations in one to produce pneumatic pulsations in the other, and one or more cocks arranged on the pulsation pipe line or lines in which relay pulsations are produced, said branch pipe being connectible to said cock or cocks, whereby pulsations of the required strength to render the milking machine unit efficiently operable may be produced in a milking machine unit relatively distant from the primary pulsator.

2. In a milking machine operating system, in combination, a primary pulsation pipe line and means to produce primary pneumatic pulsations therein, a secondary pulsation pipe line, a relay valve controllable by said primary pneumatic pulsations to produce secondary pneumatic pulsations in the secondary pulsation pipe line, teat cups, and means connected with, and operable by the pulsations in, the secondary pulsation pipe line to produce pulsations within the teat cups.

3. In a milking machine operating system, the combination with a primary pulsation pipe line and means to produce pneumatic pulsations therein, a vacuum pipe line, and a secondary pulsation pipe line, of a relay valve operable by pneumatic pulsations from said primary pulsation pipe line to connect the secondary pulsation pipe line alternately with the vacuum pipe line and with the atmosphere.

4. In a milking machine operating system, the combination with teat cups, of a pulsator connected with and adapted to produce pulsations in the teat cups, a secondary pulsation line connected with and controlling the operation of said pulsator, a primary pulsation line and a primary pulsator adapted to produce primary pneumatic pulsations therein, and a relay connected with the primary pulsation line and controllable by the pulsations therein to produce secondary pneumatic pulsations in the secondary pulsation line.

5. In a milking machine operating system, in combination, a set of double chambered teat cups and teat cup pipes connected with the outer chambers of the respective teat cups, a secondary pulsator connected with and adapted to produce pulsations in said pipes, a primary pulsator and a plurality of pulsation pipe lines one connected with, and the other relatively distant from, the primary pulsator, a relay valve controllable by the primary pulsations communicated to the first pulsation pipe line to produce pneumatic pulsations in the second pulsation pipe line, and a branch pipe connected with the secondary pulsator and adapted to be connected to the second pulsation pipe line, whereby pulsations of the required strength to operate the pulsator may be produced in the branch pipe leading thereto.

6. In a milking machine operating system, the combination with two-chamber teat cups, pipes connected with the outer chambers thereof, a vacuum pipe connected with the inner teat cup chambers, a pulsator connected with and adapted to produce pulsations in the outer teat cup chambers, a primary pulsation line and a primary pulsator adapted to produce pneumatic pulsations therein, a secondary pulsation line connected with and controlling the operation of the first named pulsator, and a relay valve connected with and operable by pneumatic pulsations from the primary pulsation pipe line to produce secondary pulsations in the secondary pulsation pipe line.

7. In a milking machine operating system, the combination with two-chamber teat cups, pipes connected with the outer chambers thereof, a vacuum line connected with the inner teat cup chambers, a pulsator connected with and adapted to produce pulsations in the outer teat cup chambers, a primary pulsation line and a primary pulsator adapted to produce pneumatic pulsations therein, a secondary pulsation line connected with and controlling the operation of the first named pulsator, and a relay valve connected with and operable by pneumatic pulsations from the primary pulsation pipe line to connect the secondary pulsation pipe line alternately with the vacuum line and with the atmosphere.

8. In a milking machine operating system, the combination with two-chamber teat cups, pipes connected with the outer chambers thereof, a vacuum line connected with the inner chambers thereof, a pulsator valve adapted to connect each of the said pipes alternately with the atmosphere and with the vacuum line, a secondary pulsation line connected with and controlling the operation of said pulsator valve, a primary pulsation line and a primary pulsator adapted to produce pneumatic pulsations therein, and a relay valve connected with and operable by pneumatic pulsations from the primary pulsation pipe line to connect the secondary pulsation pipe line alternately with the vacuum line and with the atmosphere.

In testimony of which invention I have hereunto set my hand, at city of New York, on this 2nd day of November, 1916.

NORMAN JOHN DAYSH.

Witnesses:
 GEO. R. REMINGTON,
 G. O. TALLMAN.